I. MACOWSKY & M. HOLLZER.
CO-ACTING CAR BRAKE AND FENDER.
APPLICATION FILED JUNE 26, 1911.
1,018,978.
Patented Feb. 27, 1912.
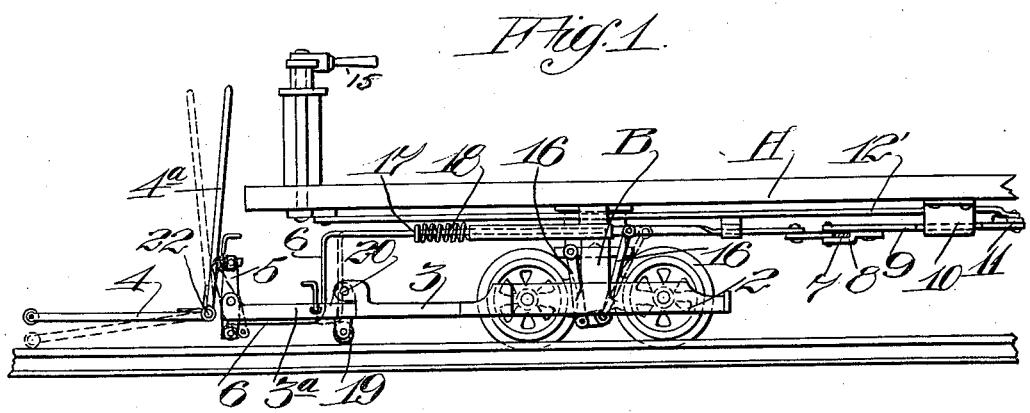
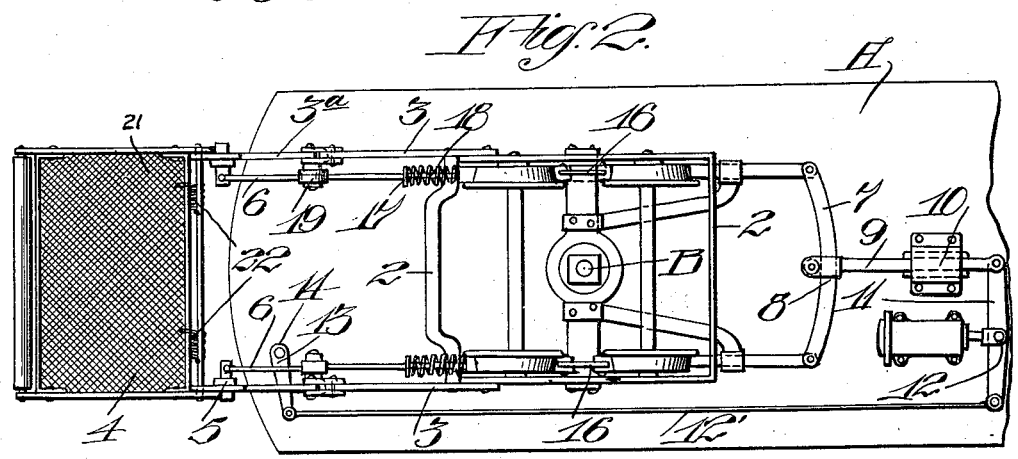
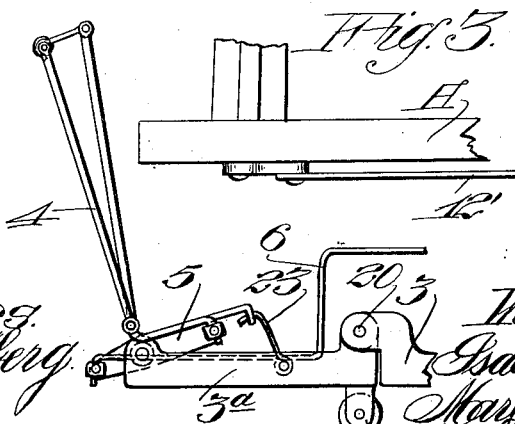

UNITED STATES PATENT OFFICE.

ISAAC MACOWSKY AND MARC HOLLZER, OF SAN FRANCISCO, CALIFORNIA.

CO-ACTING CAR BRAKE AND FENDER.

1,018,978.  Specification of Letters Patent.  Patented Feb. 27, 1912.

Application filed June 26, 1911. Serial No. 635,396.

*To all whom it may concern:*

Be it known that we, ISAAC MACOWSKY and MARC HOLLZER, both citizens of the United States, residing in the city and county of San Francisco and State of California, have invented new and useful Improvements in Co-Acting Car Brakes and Fenders, of which the following is a specification.
Our invention relates to cars and co-acting brake and fender attachments.

It consists in such a disposition of the parts and connected mechanism that the action of applying the brake to stop the car will also depress the fender into operative position, and the release of the brake will return the fender to an inoperative position.

It further consists in the combination of parts and details of construction, which will be more fully explained by reference to the accompanying drawings, in which—

Figure 1 is a side elevation of our device showing the fender elevated in full lines and lowered in dotted lines. Fig. 2 is a bottom view of the same. Fig. 3 is an enlarged view showing the fender in the raised position.

We have here shown our apparatus as mounted in connection with a car body A, having a swivel mounting B with a truck frame 2, with two pairs of bearing wheels which are turnable to conform to curvatures of the road over which the car passes.
3 is a frame here shown as attached to the side bars of the truck frame, and extending forwardly to such a point that the fender frame 4 may be supported from the front ends of these side bars. As here shown, the rear ends of the fender frame are upturned and swivelly connected with levers 5 which are pivotally connected with the front ends of the frame 3; the pivots being at points intermediate the upper and lower ends of the levers.

The lower ends of the levers are connected by rods 6 with a segment 7, which extends across beneath the car body and is slidable through a guide 8 in a draw bar 9. This draw bar is longitudinally slidable in a guide 10, which is fixed to, or carried by, the lower part of the car body. The rear end of this draw bar is connected with a cross lever 11, which is horizontally fulcrumed to a support 12 carried by the car body. The opposite end of the lever 11 is connected by the rod 12' with a rocker arm 13, which is fixed to the lower end of a vertically guided and turnable shaft 14, upon the upper end of which the operator's hand lever 15 is fixed. By this connection it will be seen that when the hand lever is moved in one direction it will, through the crank arm connecting rod 12 and cross bar or lever 11, act through the sliding bar 9 and the segmental arc 7 to operate through the connecting rods 6 and thus tilt the fender, so that when the hand lever 15 is turned to apply the brake, it will simultaneously act to depress the front of the fender to a position close to the track and thus prevent anything thereon from passing beneath the wheels.

The segmental arc which serves as a guide for the draw bar 9 has a curvature, with the king bolt or pivot of the truck as its center Thus in passing around curves, the body of the car may swing to one side or the other relative to the truck and the segment will slide through the draw bar 9, so that within the relative positions the operation of the brake lever will act upon the fender as previously described.

The brakes are here shown as carried between the wheels and are actuated by levers and connections, as at 16, which are connected with the side rods or bars 6 which operate the fender, and the movement which will apply the brake acting through these levers in the usual way will also move the fender. The applying of the brake by turning the hand lever 15 in one direction depresses the fender, as previously described, and the turning of the hand lever in the opposite direction to disengage the brake will correspondingly lift the fender clear of the track.

In order to provide a yielding connection between the fender and the brake actuating draw bar, we have shown the side bars or rods 6 as being capable of lengthening or shortening. In the present case one portion of the bar is made tubular and the other portion is fitted to telescope into the tubular portion. This second portion may carry a fixed collar 17, between which and the end of the tubular portion are fitted springs 18 of sufficient stiffness to normally maintain the side rods 6 at the full length, but any compression caused by changes of position of the parts will act to compress the springs, and thus maintain the proper elastic connection between the brake mechanism and the fender.

In order to limit the drop of the fender and keep it from absolutely rubbing upon the track, we have shown small wheels or rollers 19 journaled to the front portion 3$^a$ of the fender carrying frame. This front portion is here shown as hinged to the front portion of the bars 3 as shown at 20, and this connection allows a certain independent movement of the extreme front end of the fender.

It is customary in cars which are not reversed at the end of the track to place a fender at each end of the car, and as it is desirable to place the rear fender out of operation, we have shown the two parts of the screen surface 21 as carried upon separate portions of the frame; the lower part being carried upon the fender frame 4 and the upper part upon the supplemental frame 4$^a$, which is at its lower ends fulcrumed to the rear of the frame A. The two are normally separated by a spring 22, which maintains them at such an angle with each other, that when the lower part is depressed upon the track, the upper part will extend approximately vertical so that anything hit by the lower part of the fender will be prevented from passing beneath the car by the forwardly extending screen and its frame.

When the fender is to be tilted out of the way, the two parts may be closed together and may be locked in position by a hook or other device, as at 23, and the whole fender tilted up against the front of the car body or platform and out of the way while not in use. The ability to operate the brake and the fender simultaneously relieves the motorman of the independent care of the two portions of the apparatus, which it is often vitally necessary should be operated instantaneously.

The joints 20 in the frame bars 3 and the bearing wheels 19 for the front members of these bars, allow the front of the fender to normally travel close to the rails, but in approaching a sudden rise, where the extension of the fender in front of the wheel base would cause it to strike the rails before the main bearing wheels had reached the incline, the wheels 19 will act to lift the front of the frame and the fender, so that it will be kept out of contact with the rails; and it will be maintained automatically at an approximately even distance from the rails over all sinuosities of travel.

Having thus described our invention, what we claim and desire to secure by Letters Patent is—

1. The combination with a car and swivel wheel trucks upon which it is carried, of side rods extending forwardly from the truck frame, a fender carried from the front end of said side rods, other side rods by which said fender may be tilted up or down upon its mounting, a draw bar, connections between said draw bar and a manually controlled hand lever, and automatically adjustable connections between said draw bar and the side rods of the fender.

2. The combination with a car and swivel wheel trucks upon which it is carried, of side rods extending forwardly from the truck frame, a fender carried from the front end of said side rods, other side rods by which said fender may be tilted up or down upon its mounting, a draw bar, connections between said draw bar and a manually controlled hand lever, automatically adjustable connections between said draw bar and the side rods of the fender, a brake mechanism, and connections between said mechanism and the actuating bars of the fender.

3. The combination with a car and swivel wheel trucks upon which it is carried, of side bars extending forwardly from the truck frame, levers fulcrumed to said side bars, a fender frame pivotally connected with one end of said levers, rods connected with the opposite ends and extending beneath the car platform, brake actuating levers connecting with said bars, a draw bar, connections between said draw bar and a manually operated lever, and a segment with which the ends of the side bars are connected, said segment being slidably guided in the end of the draw bar.

4. The combination with a car and swiveling wheel trucks upon which it is carried, of a hinged two part fender, side bars fixed to the truck frame upon which said fender is swivelly mounted, co-acting, manually controlled mechanism whereby the fender may be depressed toward the track and the brakes simultaneously applied, and supplemental wheels by which the fender frame is supported with relation to the track.

5. The combination with a car body and swivel trucks upon which it is carried, of a fender composed of foldable screens, side bars fixed to the truck frames upon which the fender frame is turnably carried, means by which said fender may be depressed or raised, said fender members being foldable together, and means to lock the parts in folded position.

6. The combination with a car and its wheel trucks, of a frame composed of alined jointed members extending forwardly from the wheel base, a fender adjustably carried upon the front of the jointed frame, and bearing wheels carried by the front members of said frame, and automatically controlling the elevation of the fender front.

In testimony whereof we have hereunto set our hands in the presence of two subscribing witnesses.

ISAAC MACOWSKY.
MARC HOLLZER.

Witnesses:
JOHN H. HERRING,
ZETA HASTINGS.

Copies of this patent may be obtained for five cents each, by addressing the "Commissioner of Patents, Washington, D. C."